(12) United States Patent
Kawaguchi et al.

(10) Patent No.: US 7,980,981 B2
(45) Date of Patent: Jul. 19, 2011

(54) STEP AUTOMATIC TRANSMISSION

(75) Inventors: Takateru Kawaguchi, Shizuoka (JP); Yoshihide Shinso, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 710 days.

(21) Appl. No.: 11/962,469

(22) Filed: Dec. 21, 2007

(65) Prior Publication Data
US 2008/0234088 A1 Sep. 25, 2008

(30) Foreign Application Priority Data

Mar. 22, 2007 (JP) ................. 2007-075300

(51) Int. Cl.
*F16H 31/00* (2006.01)
*G06F 7/00* (2006.01)
*G06F 17/00* (2006.01)
*G06F 7/70* (2006.01)

(52) U.S. Cl. .......... 475/116; 475/118; 475/121; 701/61; 701/70

(58) Field of Classification Search .................. 475/116, 475/118–121, 127; 477/70, 71; 701/63
See application file for complete search history.

(56) References Cited

U.S. PATENT DOCUMENTS

| | | | |
|---|---|---|---|
| 4,785,689 A * | 11/1988 | Iwatsuki et al. | 477/161 |
| 4,843,551 A | 6/1989 | Milunas | |
| 5,016,174 A | 5/1991 | Ito et al. | |
| 5,033,328 A * | 7/1991 | Shimanaka | 477/109 |
| 5,060,540 A | 10/1991 | Yamaguchi | |
| 5,113,725 A | 5/1992 | Tomomatsu et al. | |
| 5,233,890 A | 8/1993 | Aldrich, III et al. | |
| 5,439,427 A | 8/1995 | Enokido et al. | |
| 5,613,583 A | 3/1997 | Kono et al. | |
| 5,846,162 A | 12/1998 | Ito et al. | |
| 5,855,532 A * | 1/1999 | Sugiyama | 477/97 |
| 5,957,800 A | 9/1999 | Oba et al. | |
| 6,270,439 B1 | 8/2001 | Suzuki | |
| 6,309,324 B1 * | 10/2001 | Sawa et al. | 477/125 |

(Continued)

FOREIGN PATENT DOCUMENTS

DE 100 38 144 A1 4/2001

(Continued)

OTHER PUBLICATIONS

Translation of JP06109129, Jun. 25, 2010.*

(Continued)

*Primary Examiner* — Tisha D Lewis
(74) *Attorney, Agent, or Firm* — Foley & Lardner LLP

(57) ABSTRACT

An automatic transmission of a motor vehicle, comprising a plurality of planetary gear units; a plurality of frictional elements, the frictional elements assuming engaged/disengaged condition upon receiving a ratio change instruction thereby to establish a desired speed of the transmission with the aid of the planetary gear units; a deceleration detecting means that detects a deceleration of the motor vehicle; a gear ratio detecting means that detects an actual gear ratio that is actually established in the transmission; and an interlock judgment means that judges whether or not the transmission is subjected to an interlock, the interlock being a condition wherein upon receiving the ratio change instruction, at least one of the frictional elements is brought into unintended engagement. The interlock judgment means is configured to carry out judgment of the interlock by analyzing a deceleration of the vehicle and a relation between a gear ratio intended by the ratio change instruction and an actual gear ratio actually established by the transmission while the transmission is not under a ratio change.

8 Claims, 8 Drawing Sheets

U.S. PATENT DOCUMENTS

| | | |
|---|---|---|
| 6,319,164 B1 | 11/2001 | Runde et al. |
| 6,357,289 B1 * | 3/2002 | Futawatari ................ 73/115.02 |
| 6,440,040 B1 | 8/2002 | Amano et al. |
| 6,520,881 B1 | 2/2003 | Long et al. |
| 7,140,993 B2 | 11/2006 | Long et al. |
| 7,402,123 B2 | 7/2008 | Kobayashi et al. |
| 7,410,438 B2 | 8/2008 | Moehlmann et al. |
| 7,419,452 B2 | 9/2008 | Nozaki et al. |
| 7,682,275 B2 * | 3/2010 | Yoneyama ................... 475/119 |
| 2006/0040791 A1 | 2/2006 | Nakajima et al. |
| 2007/0015624 A1 | 1/2007 | Ota et al. |
| 2008/0064568 A1 | 3/2008 | Kawaguchi et al. |
| 2008/0113848 A1 * | 5/2008 | Inoue et al. ................... 477/98 |
| 2008/0153655 A1 | 6/2008 | Kawaguchi et al. |
| 2008/0167155 A1 | 7/2008 | Kawaguchi et al. |
| 2008/0176706 A1 | 7/2008 | Wu et al. |
| 2008/0221764 A1 * | 9/2008 | Nagashima et al. ............ 701/63 |

FOREIGN PATENT DOCUMENTS

| | | |
|---|---|---|
| JP | 61-165056 A | 7/1986 |
| JP | 1-172660 A | 7/1989 |
| JP | 2-304262 A | 12/1990 |
| JP | 3-113161 A | 5/1991 |
| JP | 04-015359 A | 1/1992 |
| JP | 05-288264 A | 11/1993 |
| JP | 5-346160 A | 12/1993 |
| JP | 6-109129 A | 4/1994 |
| JP | 8-219274 A | 8/1996 |
| JP | 09-089098 A | 3/1997 |
| JP | 09-317871 A | 12/1997 |
| JP | 11-280896 A | 10/1999 |
| JP | 11-280898 A | 10/1999 |
| JP | 2000-240785 A | 9/2000 |
| JP | 2003097691 A * | 4/2003 |
| JP | 2004-068989 A | 3/2004 |

OTHER PUBLICATIONS

U.S. Appl. No. 12/029,632, filed Feb. 12, 2008, Kawaguchi et al.

T. Kawaguchi. U.S. PTO Office Action, U.S. Appl. No. 12/029,632, dated Sep. 1, 2010, 13 pages.

T. Kawaguchi, U.S. PTO Notice of Allowance, U.S. Appl. No. 11/946,483, dated Aug. 26, 2010, 21 pages.

T. Kawaguchi, U.S. PTO Notice of Allowance, U.S. Appl. No. 11/853,181, dated Sep. 23, 2010, 10 pages.

T. Kawaguchi, U.S. PTO Notice of Allowance, U.S. Appl. No. 12/029,632, dated Nov. 4, 2010, 5 pages.

T. Kawaguchi, U.S. PTO Notice of Allowance, U.S. Appl. No. 11/955,794, dated Dec. 28, 2010, 18 pages.

* cited by examiner

FIG.3

|     | B1<br>Fr/B | C1<br>I/C | C2<br>D/C | C3<br>H&LR/C | B2<br>LOW/B | B3<br>2346/B | B4<br>R/B | F1 | F2 |
|-----|-----|-----|-----|-----|-----|-----|-----|-----|-----|
| 1st | (○) |   |   | (○) | ○ |   |   | ○ | ○ |
| 2nd |   |   |   | (○) | ○ | ○ |   |   | ○ |
| 3rd |   |   | ○ |   | ○ | ○ |   |   |   |
| 4th |   |   | ○ | ○ |   | ○ |   |   |   |
| 5th |   | ○ | ○ | ○ |   |   |   |   |   |
| 6th |   | ○ |   | ○ |   | ○ |   |   |   |
| 7th | ○ | ○ |   | ○ |   |   |   | ○ |   |
| Rev | ○ |   |   | ○ |   |   | ○ |   |   |

FIG.6

| SPEED | FRICTIONAL ELEMENTS THAT CAUSE INTERLOCK OF TRANSMISSION WHEN SUBJECTED MIS-ENGAGEMENT | FRICTIONAL ELEMENT THAT ESTABLISHES SPEED WHEN, UNDER LEFT-MENTIONED INTERLOCK CONDITION, RELEASED | SPEED ESTABLISHED AFTER RELEASE OF LEFT-MENTIONED FRICTIONAL ELEMENT |
|---|---|---|---|
| 4th | I/C | 2346/B | 5th |
| | Fr/B | | 2.5th |
| 5th | 2346/B | D/C | 6th |
| | Fr/B | | 7th |
| 6th | D/C | 2346/B | 5th |
| | Fr/B | | 7th |
| 7th | 2346/B | Fr/B | 6th |
| | D/C | | 5th |

STEP AUTOMATIC TRANSMISSION

BACKGROUND OF THE INVENTION

1. Field of the Invention

The present invention relates in general to automatic transmissions of step type (viz., non-continuously variable type), and more particularly to the automatic transmissions of a type that is equipped with means for sensing an undesired interlock of an input or output shaft of the transmission.

2. Description of the Related Art

Automatic transmissions of the above-mentioned step type are constructed to assume desired speeds by selectively connecting and disconnecting a plurality of frictional elements with the aid of hydraulic actuators. These actuators comprise valves with spools. If, under cruising of an associated motor vehicle, some valve spool of the actuators is subjected to a stick condition or some engaged frictional element is subjected to such stick condition for some reason, undesired interlock takes place in the transmission, which causes a sudden deceleration of the vehicle against will of the driver. As is know, the interlock is a locked condition of input or output shaft of the transmission which is induced when intended engagement of one frictional element and unintended engagement of the other frictional element take place at substantially same time. Of course, such sudden deceleration of the vehicle caused by the interlock makes the driver as well as other passengers of the vehicle uncomfortable.

In order to solve and eliminate such undesired phenomenon, various measures have been hitherto proposed and put into practical use, one of which is disclosed in Japanese Laid-open Patent Application (Tokkaisho) 61-165056. In the measure of this publication, a pressure sensor is arranged in a hydraulic circuit of each frictional element, and if the pressure sensor senses a certain degree of hydraulic pressure in the hydraulic circuit under a condition wherein no instruction signal for such hydraulic pressure is issued, judgment is so made that an interlock has taken place in the transmission. Furthermore, if, during a ratio change operation, a variation in acceleration of the vehicle between before and after the ratio change exceeds a given value, it is judged that an interlock may have taken place.

SUMMARY OF THE INVENTION

However, due to their inherent constructions, the above-mentioned measures have the following shortcomings.

That is, in case of the measure disclosed in Japanese Laid-open Patent Application (Tokkaisho) 61-165056, usage of the pressure sensor in the hydraulic circuits of each frictional element increases the number of parts used, which brings about increase in cost as well as increase in size of a hydraulic control device of the transmission. This shortcoming becomes much severe when the transmission is constructed to have multi-speeds. Furthermore, it has been revealed that due to inevitable hydraulic vibration, each pressure sensor tends to take ON-operation, which causes a mis-judgment for the interlock.

In case for detecting the interlock by checking the variation in acceleration of the vehicle between before and after the steed change, it may be though out that a variation in rotation speed of an output shaft of the transmission per unit time before and after the ratio change is used for detecting the interlock. However, in this case, the following undesirable tendency takes place. That is, when drive road wheels of the vehicle rapidly change their condition from a slip condition to a grip condition, the rotation speed of the output shaft is rapidly reduced. Upon this, a control unit may judge a rapid deceleration of the vehicle and may issue a mis-judgment for the interlock of the transmission. Furthermore, if, under cruising, the vehicle comes up to an uphill slope or comes into a puddle road or the like, the vehicle is subjected to a rapid deceleration, which may cause a mis-judgment for the interlock.

It is therefore an object of the present invention to provide a step automatic transmission which is free of the above-mentioned drawbacks.

According to the present invention, there is provided a step automatic transmission which assuredly avoids a mis-judgment for interlock and assuredly detects occurrence of the interlock thereof.

In accordance with a first aspect of the present invention, there is provided an automatic transmission of a motor vehicle, which comprises a plurality of planetary gear units; a plurality of frictional elements, the frictional elements assuming engaged/disengaged condition upon receiving a ratio change instruction thereby to establish a desired speed (or speed ratio) of the transmission with the aid of the planetary gear units; a deceleration detecting means that detects a deceleration of the motor vehicle; a gear ratio detecting means that detects an actual gear ratio that is actually established in the transmission; and an interlock judgment means that judges whether or not the transmission is subjected to an interlock, the interlock being a condition wherein upon receiving the ratio change instruction, at least one of the frictional elements is brought into unintended engagement, the interlock judgment means being configured to carry out judgment of the interlock by analyzing a deceleration of the vehicle and a relation between a gear ratio intended by the ratio change instruction and an actual gear ratio actually established by the transmission while the transmission is not under a ratio change.

In accordance with a second aspect of the present invention, there is provided, in an automatic transmission of a motor vehicle including a plurality of planetary gear units and a plurality of frictional elements, the frictional elements assuming engaged/disengaged condition upon receiving a ratio change instruction thereby to establish a desired speed of the transmission with the aid of the planetary gear units, a method for judging an interlock of the transmission, which comprises detecting a deceleration of the motor vehicle; detecting an actual gear ratio that is actually established in the transmission; and judging whether or not the transmission is subjected to an interlock, the interlock being a condition wherein upon receiving the ratio change instruction, at least one of the frictional elements is brought into unintended engagement, the judgment for the interlock being carried out by analyzing the deceleration of the vehicle and a relation between the gear ratio intended by the ratio change instruction and the actual gear ratio while the transmission is not under a ratio change.

BRIEF DESCRIPTION OF THE DRAWINGS

Other objects and advantages of the present invention will become apparent from the following description when taken in conjunction with the accompanying drawings, in which:

FIG. 3 is a table showing ON/OFF condition of various frictional elements with respect to speeds established by the transmission;

FIG. 6 is a table showing a frictional element that is to be disengaged or released under a temporary limp-home control established after detection of an interlock with respect to speeds;

DETAILED DESCRIPTION OF THE INVENTION

In the following, a step automatic transmission according to the present invention will be described in detail with reference to the accompanying drawings.

Figure 1:
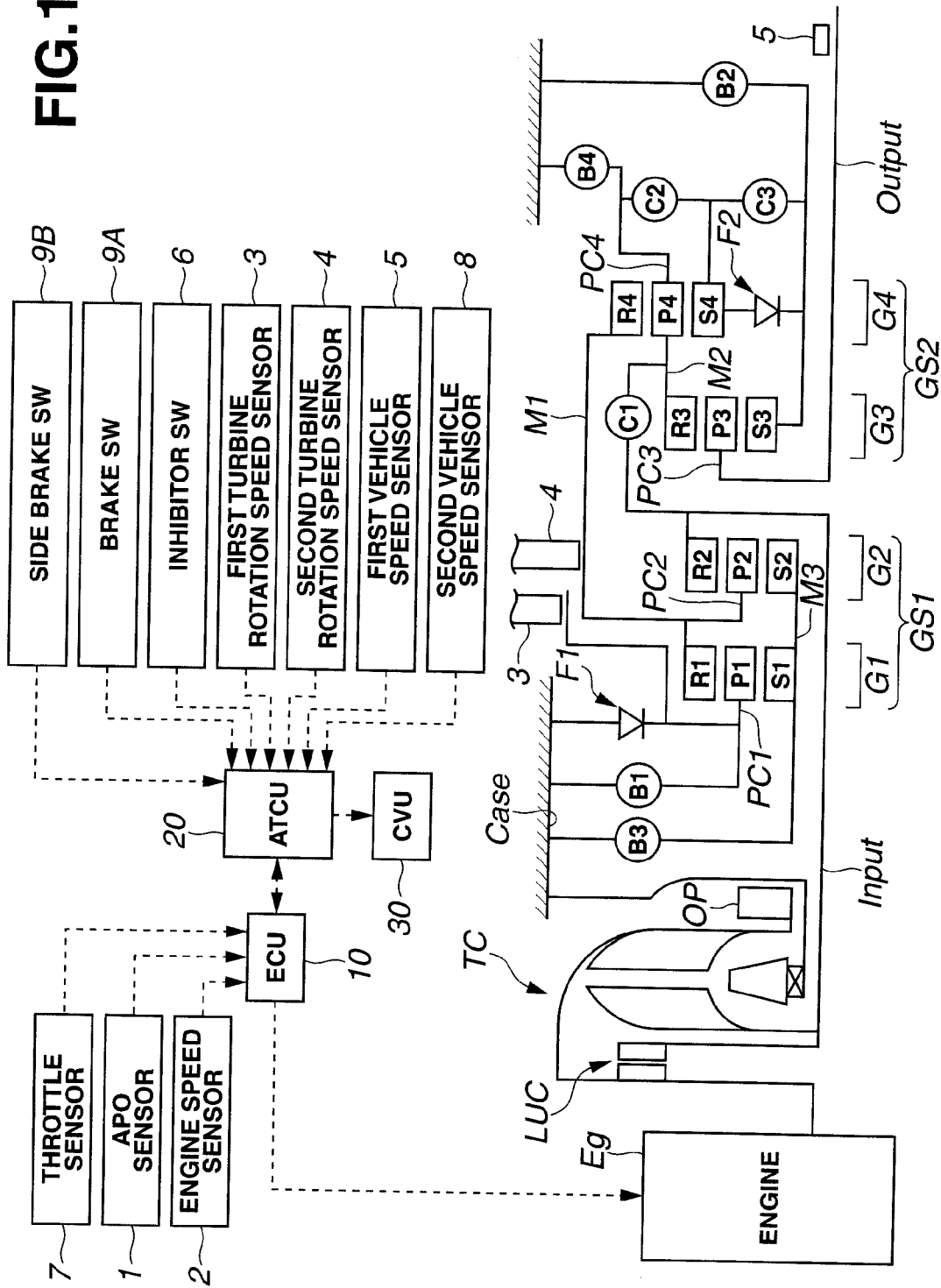
FIG. 1 is a schematic diagram of a step automatic transmission according to the present invention.

Referring to FIG. 1, there is shown in a schematic manner the automatic transmission of the invention. The automatic transmission is of a step type having seven forward speeds and one reverse.

That is, the automatic transmission comprises an input shaft "Input" to which a drive force of an engine En is fed through a torque converter TC. The transmission further comprises four planetary gear units, seven frictional elements and an output shaft "Output" through which the drive force is transmitted to drive road wheels (not shown) while being subjected to a ratio change.

An oil pump OP is arranged around an axis of a pump impeller of the torque converter TC, so that under operation of the engine Eg, the oil pump OP produces a pressurized oil fed to hydraulic circuits of the transmission.

For controlling an operation of the engine Eg, there is provided an engine control unit (ECU) 10, for controlling an operation of the automatic transmission, there is provided an automatic transmission control unit (ATCU) 20, and for controlling hydraulic pressure of the frictional elements in accordance with instruction signals from the automatic transmission control unit (ATCU), there is provided a control valve unit (CVU) 30. As is seen from FIG. 1, these three units 10, 20 and 30 connected to one another to share various information signals, which are information signals from sensors and those processed by the units.

As shown, to the engine control unit (ECU) 10, there are connected an accelerator pedal depression degree sensor (APO) 1 that senses a degree by which an accelerator pedal is depressed by a driver, an engine speed sensor 2 that senses a rotation speed of the engine Eg and a throttle sensor 7 that senses an open degree of a throttle valve in an intake system. By processing the information signals from these sensors 1, 2 and 7, the engine control unit (ECU) controls a fuel injection amount fed to the engine Eg and the open degree of the throttle valve in the intake system thereby to control the engine speed and the engine torque.

As shown in the drawing, to the automatic transmission controller unit (ATCU) 20, there are connected a first turbine rotation speed sensor 3 that senses a rotation speed of an after-mentioned first carrier PC1, a second turbine rotation speed sensor 4 that senses a rotation speed of an after-mentioned first ring gear R1, a first vehicle speed sensor 5 that directly senses a rotation speed of the output shaft "Output" and derives a vehicle speed therefrom, a second vehicle speed sensor 8 that directly senses a rotation speed of the drive road wheels and derives a vehicle speed therefrom, an inhibitor switch 6 that senses a shift lever operation manner carried out by the driver, a brake switch 9A that, for sensing a drive road wheel braking condition, is turned ON from OFF when a brake pedal is depressed by a degree greater than a predetermined value and a side brake switch 9B that, for sensing a condition of a side brake, is turned ON from OFF when a side brake lever is actuated by a degree greater than a predetermined value. As will be clarified hereinafter, under D-range operation of the transmission, the automatic transmission control unit (AYCU) 20 selects an optimum speed instruction based on a vehicle speed Vsp and a throttle valve open degree, and issues a corresponding instruction signal to the control valve unit (CVU) 30 for achieving the optimum speed that is most suited for the running condition of the vehicle.

In the following, a ratio change mechanism arranged between the input shaft "Input" and the output shaft "Output" will be described with reference to FIG. 1. That is, due to work of the ratio change mechanism, rotation of the input shaft "Input" is transmitted to the output shaft "Output" while being subjected to a ratio change.

As shown in FIG. 1, the ratio change mechanism comprises first and second groups of planetary gear sets GS1 and GS2 which are coaxially arranged on a common axis (no numeral) of the input and output shafts "Input" and "Output". As shown, the first group of planetary gear set GS1 is arranged about the input shaft "Input", the second group of planetary gear set GS2 is arranged about the output shaft "output".

The ratio change mechanism further comprises as frictional elements three clutches C1, C2 and C3 and four brakes B1, B2, B3 and B4, and as clutches two one-way clutches F1 and F2.

The first group of planetary gear set GS1 comprises a first planetary gear unit G1 and a second planetary gear unit G2 which are coaxially arranged around the common axis.

The first planetary gear unit G1 is of a single pinion type which comprises a first sun gear S1, a first ring gear R1, first pinions P1 each being meshed with both the first sun gear S1 and the first ring gear R1, and a first pinion carrier PC1 that carries the first pinions P1.

The second planetary gear unit G2 is also a single pinion type which comprises a second sun gear S2, a second ring gear R2, second pinions P2 each being meshed with both the second sun gear S2 and the second ring gear R2, and a second pinion carrier PC2 that carries the second pinions P2.

The second group of planetary gear sets GS2 comprises a third planetary gear unit G3 and a fourth planetary gear unit G4 which are coaxially arranged around the common axis.

The third planetary gear unit G3 is also of a signal pinion type which comprises a third sun gear 53, a third ring gear R3, third pinions P3 each being meshed with both the third sun gear S3 and the third ring gear R3, and a third pinion carrier PC3 that carries the third pinions P3.

The fourth planetary gear unit G4 is also of a signal pinion type which comprises a fourth sun gear S4, a fourth ring gear R4, fourth pinions P4 each being meshed with both the fourth sun gear S4 and the fourth ring gear R4, and a fourth pinion carrier PC4 that carries the fourth pinions P4.

As shown, the input shaft "Input" is connected to the second ring gear R2 to transmit thereto a driving force from the engine Eg through the torque converter TC. The output shaft "Output" is connected to the third pinion carrier PC3 to transmit an outputted driving force to drive road wheels (not shown) of the vehicle through a final gear.

Designated by reference numeral M1 is a first connecting member that integrally connects the first ring gear R1, the second pinion carrier PC2 and the fourth ring gear R4. Designated by reference numeral M2 is a second connecting member that integrally connects the third ring gear R3 and the fourth pinion carrier PC4. Designated by numeral M3 is a third connecting member that integrally connects the first and second sun gears S1 and S2.

As shown in the drawing, in the first group of planetary gear set GS1, the first and second planetary gear units G1 and G2 are connected by means of the first and third connecting members M1 and M3, and thus the first group of planetary gear set GS1 is constructed to have four rotational elements. While, in the second group of planetary gear set GS2, the third and fourth planetary gear units G3 and G4 are connected by means of the second connecting member M2, and thus the second group of planetary gear set GS2 is constructed to have five rotational elements.

In the first group of planetary gear set GS1, a torque is led to the second ring gear R2 from the input shaft "Input", and the torque thus led to the second ring gear R2 is then led to the second group of planetary gear set GS2 through the first connecting member M1. In the second group of planetary gear set GS2, the torque is directly led to the second connecting member M2 from the input shaft "Input" and at the same time the torque is led to the fourth ring gear R4 through the first connecting member M1, and the toque thus led thereto is led to the output shaft "Output" from the third pinion carrier PC3.

The clutch C1 is an input clutch for selectively connecting and disconnecting the input shaft "Input" and the second connecting member M2. The clutch C2 is a direct clutch for selectively connecting and disconnecting the fourth sun gear S4 and the fourth pinion carrier PC4.

The clutch C3 is a H & LR clutch for selectively connecting and disconnecting the third sun gear S3 and the fourth sun gear S4. As shown, between the third sun gear S3 and the fourth sun gear S4, there is arranged the clutch F2 which is a second one-way clutch. Thus, when, with the H & LR clutch C3 kept disengaged, the fourth sun gear S4 rotates faster than the third sun gear S3, these two sun gears S4 and S3 are permitted to rotate separately at respective speeds. That is, the third planetary gear unit G3 and the fourth planetary gear unit G4 are connected through the second connecting member M2, so that these gear units G3 and G4 can output respective gear ratios.

The brake B1 is a front brake that selectively brakes or stops rotation of the first pinion carrier PC1. The clutch F1 that is a first one-way clutch is arranged in parallel with the front brake B1. The brake B2 is a low brake that selectively brakes or stops rotation of the third sun gear S3. The brake B3 is a 2346 brake that selectively brakes or stops rotation of the third connecting member M3 by which the first and second gears S1 and S2 are connected. The brake M4 is a reverse brake that selectively brakes or stops rotation of the fourth pinion carrier PC4.

Figure 2:
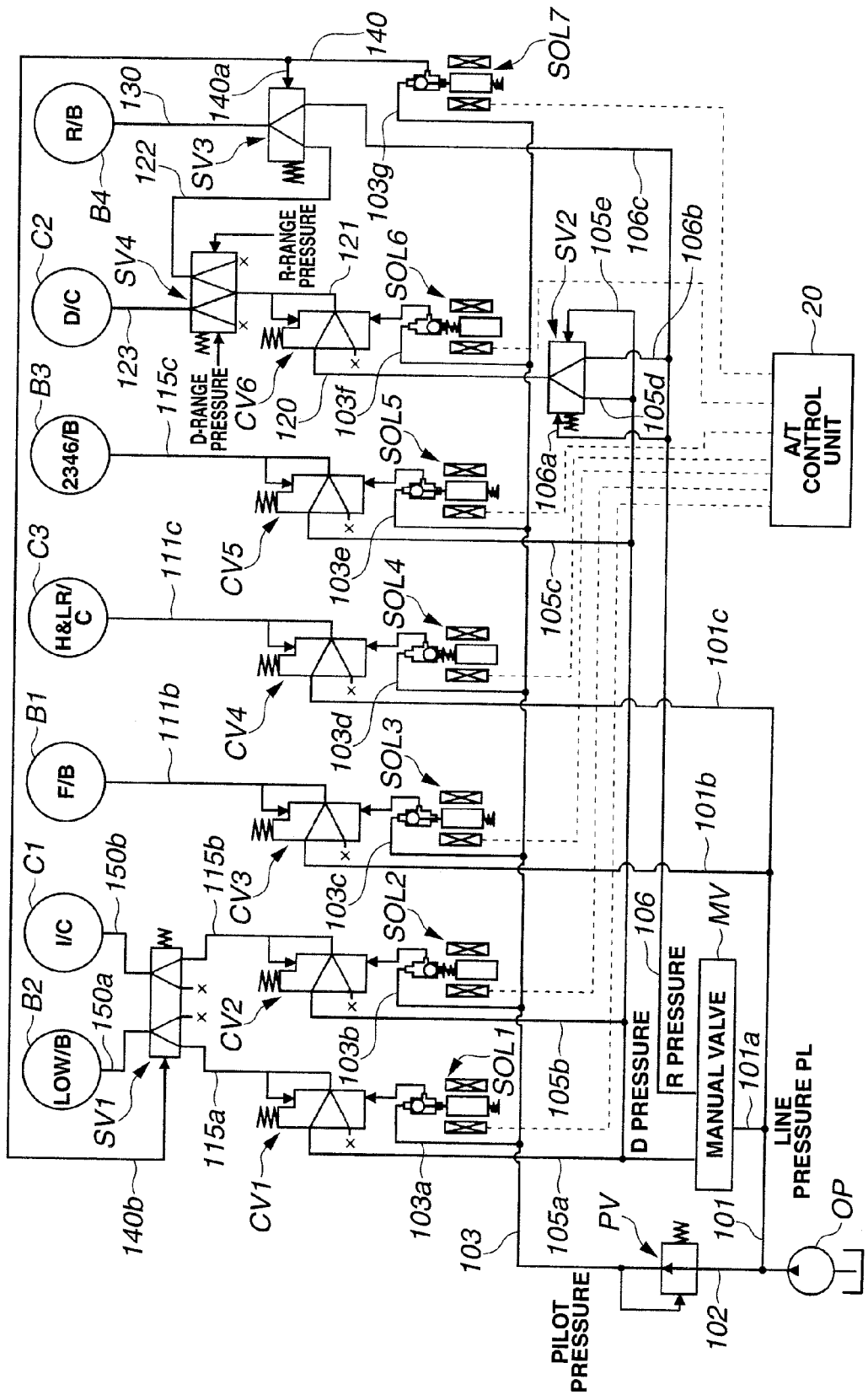
FIG. 2 is a circuit diagram of a control valve unit used in the transmission of the invention.

In the following, the hydraulic circuit of the control valve unit (CVU) 30 will be described in detail with reference to FIG. 2.

The hydraulic circuit is connected to the afore-mentioned oil pump OP, a manual valve MV and a pilot valve PV. As is mentioned hereinabove, the oil pump OP is powered by an associated engine to produce a pressurized oil, and thus serves as a hydraulic power source. The manual valve MV is actuated by a shift lever movement manipulated by a driver for switching the oil passage to which a line pressure PL is applied, and the pilot valve PV functions to reduces the line pressure PL to a predetermined level.

In the hydraulic circuit, there are further installed a first pressure regulating valve CV1 that regulates an engaging pressure of the low brake B2, a second pressure regulating valve CV2 that regulates the engaging pressure of the input clutch C1, a third pressure regulating valve CV3 that regulates the engaging pressure of the front brake B1, a fourth pressure regulating valve CV4 that regulates the engaging pressure of the H & RL clutch C3, a fifth pressure regulating valve CV5 that regulates the engaging pressure of the 2346 brake B3 and a sixth pressure regulating valve CV6 that regulates the engaging pressure of the direct clutch C2.

Furthermore, in the hydraulic circuit, there are installed a first switch valve SV1 that selectively opens one of two oil supply passages which are a passage to the low brake B2 and another passage to the input clutch C1, a second switch valve SV2 that selectively opens one of two oil supply passages which are a passage for feeding the direct clutch C2 with a D-range pressure and another passage for feeding the direct clutch C2 with a R-range pressure, a third switch valve SV3 that selectively opens one of two oil supply passages which are a passage for feeding the reverse brake B4 with the pressure regulated by the sixth pressure regulating valve CV6 and another passage for feeding the reverse brake B4 with the R-range pressure, and a fourth switch valve SV4 that selectively opens one of two oil supply passages which are a passage for feeding a passage 123 with the regulated pressure from the sixth pressure regulating valve CV6 and another passage for feeding a passage 122 with the regulated pressure from the sixth pressure regulating valve CV6. As shown, the passage 123 is led to the direct clutch C2, and the passage 122 is led to the third switch valve SV3.

Furthermore, in the hydraulic circuit, there are installed first, second, third, fourth, fifth, sixth and seventh solenoid valves SOL1, SOL2, SOL3, SOL4, SOL5, SOL6 and SOL7 that are operated in accordance with instruction signals issued from the automatic transmission control unit (ATCU) 20. These first, second, third, fourth, fifth and sixth solenoid valves SLO1, SOL2, SOL3, SOL4, SOL5 and SOL6 output pressure regulating signals to the first, second, third, fourth, fifth and sixth pressure regulating valves CV1, CV2, CV3, CV4, CV5 and CV6 respectively. The seventh solenoid valve SOL7 outputs switch signals to both first switch valve SV1 and third switch valve SV3.

As shown in the drawing (viz., FIG. 2), a hydraulic pressure discharged from the oil pump OP is regulated to the line pressure PL and then fed to oil passages 101 and 102. To the oil passage 101, there are connected an oil passage 101a that is led to the manual valve MV, an oil passage 101b that delivers a base pressure for the engaging pressure applied to the front brake B1 and an oil passage 101c that delivers a base pressure for the engaging pressure applied to the H & LR clutch C3.

As shown, to the manual valve MV, there are connected an oil passage 105 and an oil passage 106 that is for delivering R-range pressure upon selection of Reverse of the transmission. That is, in response to a shift lever movement manipulated by a driver, either one of the oil passages 105 and 106 becomes operative or opened.

To the oil passage 106, there are connected an oil passage 105a that delivers a base pressure for the engaging pressure applied to the low brake B2, an oil passage 105b that delivers a base pressure for the engaging pressured applied to the input clutch C1, an oil passage 105c that delivers a base pressure for the engaging pressure applied to the 2346 brake B3, an oil passage 105d that delivers a base pressure for the engaging pressure applied to the direct clutch C2 and an oil passage 105e that delivers a base pressure for the engaging pressure applied to the second switch valve SV2.

To the oil passage 106, there are connected an oil passage 106a that feeds the second switch valve SV2 with another switch pressure, an oil passage 106b that delivers a base pressure for the engaging pressure applied to the direct clutch C2 and an oil passage 106c that feeds the reverse brake B4 with the engaging pressure.

To the oil passage 102, there is connected an oil passage 103 through the pilot valve PV for delivering a pilot pressure. To the oil passage 103, there are connected an oil passage 103a that feeds the first solenoid valve SOL1 with the pilot pressure, an oil passage 103b that feeds the second solenoid valve SOL2 with the pilot pressure, an oil passage 103c that feeds the third solenoid valve SOL3 with the pilot pressure, an oil passage 103d that feeds the fourth solenoid valve SOL4 with the pilot pressure, an oil passage 103e that feeds the fifth solenoid valve SOL5 with the pilot pressure, an oil passage 103f that feeds the sixth solenoid valve SOL6 with the pilot pressure and an oil passage 103g that feeds the seventh solenoid valve SOL7 with the pilot pressure.

In the following, operation of the ratio change mechanism that has the above-mentioned construction will be described in detail with reference to FIGS. 3 and 4.

FIG. 3 is a table showing ON/OFF condition of the frictional elements with respect to speeds established by the transmission. Each bare circle in the table shows ON (or engaged) condition of the corresponding frictional element. Each bracketed circle shows ON (or engaged) condition of the corresponding frictional element in case wherein a range position of establishing engine brake is selected. FIG. 4 is a lever diagram showing a rotation condition of each rotation member with respect to speeds.

As is seen from the table of FIG. 3, under First speed ($1^{st}$), the low brake B2 is engaged and the first and second one-way clutches F1 and F2 are engaged (viz., in their locked condition). Under First speed with engine brake, the front brake B1 and the H & LR clutch C3 are engaged additionally.

Due to engagement of the first one-way clutch F1, rotation of the first pinion carrier PC1 is suppressed, and thus, the rotation inputted to the second ring gear R2 from the input shaft "Input" is reduced in speed by the first group of planetary gear set GS1, and the rotation thus reduced in speed is outputted from the first connecting member M1 to the fourth ring gear R4. Due to engagement of the low brake B2 and engagement of the second one-way clutch F2, rotation of the third sun gear S3 and that of the fourth sun gear S4 are suppressed, and thus, the rotation inputted to the fourth ring gear R4 is reduced in speed by the second group of planetary gear set GS2 and outputted from the third pinion carrier PC3.

Figure 4:
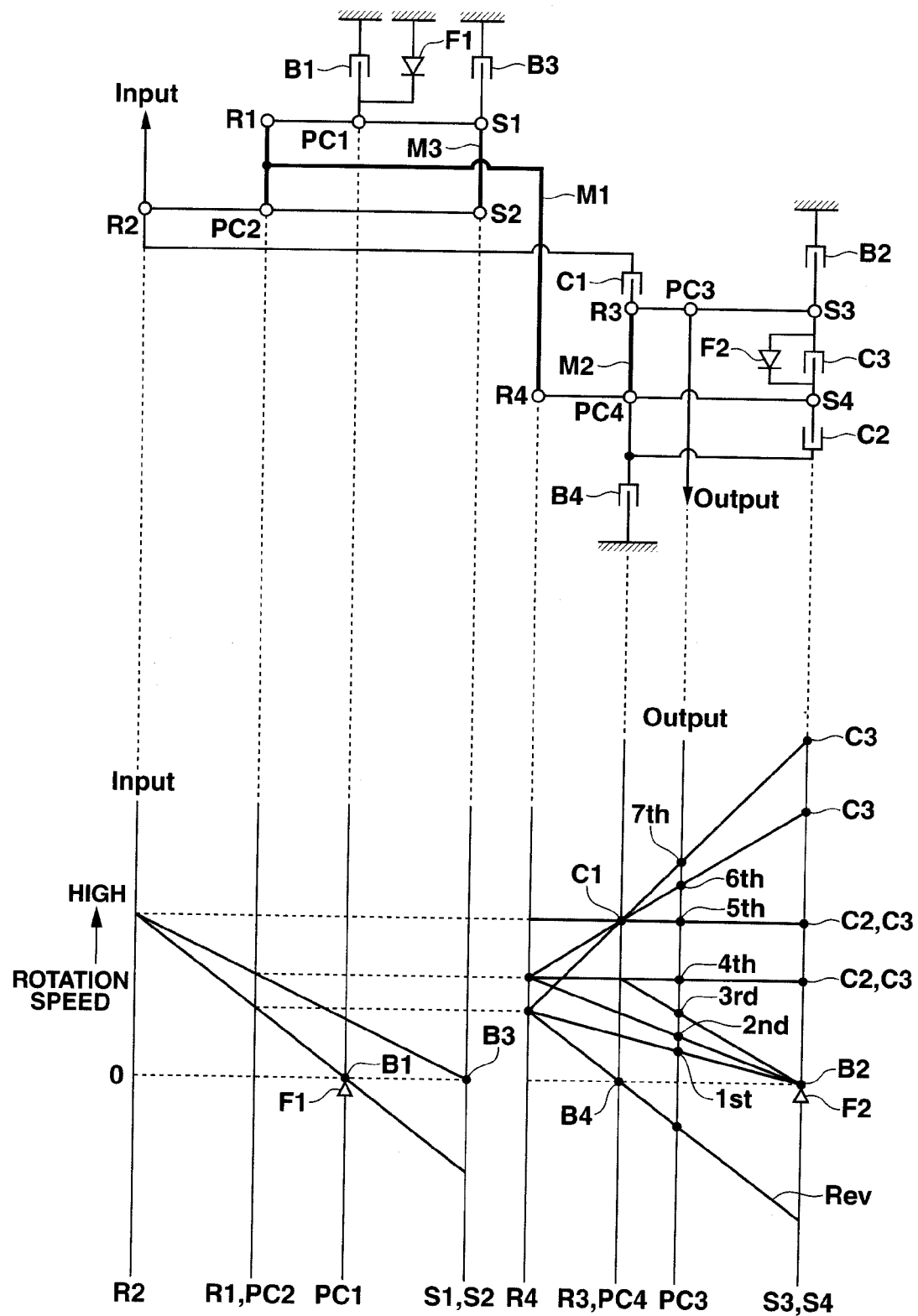
FIG. 4 is a lever diagram showing a rotation condition of each rotation member with respect to speeds.

That is, as is seen from the lever diagram of FIG. 4, the rotation from the input shaft "Input" is reduced in speed by the first group of planetary gear set GS1 and by the second group of planetary gear set GS2 and outputted from the output shaft "Output".

Under Second speed ($2^{nd}$), the low brake B2 and the 2346 brake B3 are engaged, and the second one-way clutch F2 is engaged. Under Second speed with engine brake, the H & LR clutch C3 is engaged additionally.

Due to engagement of the 2346 brake B3, rotation of the first sun gear S1 and that of the second sun gear S2 are suppressed, and thus, rotation inputted to the second ring gear R2 from the input shaft "Input" is reduced in speed by only the second planetary gear unit G2, and this reduced rotation is outputted to the fourth ring gear R4 from the first connecting member M1. Due to engagement of the low brake B2 and engagement of the second one-way clutch F2, rotation of the third sun gear S3 and that of the fourth sun gear S4 are suppressed, and thus, the rotation inputted to the fourth ring gear R4 is reduced in speed by the second group of planetary gear set GS2 and outputted from the third pinion carrier PC3.

That is, as is seen from the lever diagram of FIG. 4, the rotation from the input shaft "Input" is reduced in speed by the first group of planetary gear set GS1 and by the second group of planetary gear set GS2 and outputted from the output shaft "Output".

Under Third speed ($3^{rd}$), the low brake B2, the 2346 brake B3 and the direct clutch C2 are engaged.

Due to engagement of the 2346 brake B3, rotation of the first sun gear S1 and that of the second sun gear S2 are suppressed. Thus, the rotation inputted to the second ring gear R2 from the input shaft "Input" is reduced in speed by the second planetary gear unit G2, and the rotation reduced in speed is outputted from the first connecting member M1 to the fourth ring gear R4. Due to engagement of the direct clutch C2, the fourth planetary gear unit G4 is forced to rotate as one unit. Thus, the fourth planetary gear unit G4 does not participate in a speed reduction while participating in a torque transmission. Furthermore, due to engagement of the low brake B2, rotation of the third sun gear S3 is suppressed. Thus, the rotation inputted from the fourth pinion carrier PC4, which integrally rotates with the fourth ring gear R4, to the third ring gear R3 through the is second connecting member M2 is reduced in speed by the third planetary gear unit G3 and outputted from the third pinion carrier PC3.

That is, as is seen from the lever diagram of FIG. 4, the rotation from the input shaft "Input" is reduced in speed by the first group of planetary gear set GS1 and by the third planetary gear unit G3 of the second group of planetary gear set GS2, and outputted from the output shaft "Output".

Under Fourth speed ($4^{th}$), the 2346 brake B3, the direct clutch C2 and the H & LR clutch C3 are engaged.

Due to engagement of the 2346 brake B3, rotation of the first sun gear S1 and that of the second sun gear S2 are suppressed. Thus, the rotation inputted to the second ring gear R2 from the input shaft "Input" is reduced in speed by only the second planetary gear unit G2, and the rotation thus reduced in speed is outputted to the fourth ring gear R4 from the first connecting member M1. Due to engagement of the direct clutch C2 and the H & LR clutch C3, the second group of planetary gear set GS2 is forced to rotate as one unit, and thus, the rotation inputted to the fourth ring gear R4 is directly outputted from the third pinion carrier PC3.

That is, as is seen from the lever diagram of FIG. 4, the rotation from the input shaft "Input" is reduced in speed by the first group of planetary gear set GS1 and outputted from the output shaft "Output" without being reduced in speed by the second group of planetary gear set GS2.

Under Fifth speed ($5^{th}$), the input clutch C1, the direct clutch C2 and the H & LR clutch C3 are engaged.

Due to engagement of the input clutch C1, the rotation of the input shaft "Input" is directly inputted to the second connecting member M2. Furthermore, due to engagement of the direct clutch C2 and the H & LR clutch C3, the second planetary gear unit GS2 is forced to rotate as one unit, and thus, the rotation of the input shaft "Input" is directly outputted from the third pinion carrier PC3.

That is, as is seen from the lever diagram of FIG. 4, the rotation of the input shaft "Input" is outputted from the output shaft "Output" without being reduced in speed by both the first and second groups of planetary gear sets GS1 and GS2.

Under Sixth speed ($6^{th}$), the input clutch C1, the H & LR clutch C3 and the 2346 brake B3 are engaged.

Due to engagement of the input clutch C1, the rotation of the input shaft "Input" is inputted to the second ring gear R2 and at the same time to the second connecting member M2. Due to engagement of the 2346 brake B3, rotation of the first sun gear S1 and that of the second sun gear S2 are suppressed, and thus, the rotation from the input shaft "Input" is reduced in speed by the second planetary gear unit G2 and the rotation thus reduced in speed is outputted to the fourth ring gear R4 from the first connecting member M1.

Furthermore, due to engagement of the H & LR clutch C3, the third and fourth sun gears S3 and S4 are forced to rotate like a single unit, and thus, the second group of planetary gear set GS2 outputs from the third pinion carrier PC3 a rotation that is controlled by both rotation of the fourth ring gear R4 and rotation of the second connecting member M2.

That is, as is seen from the lever diagram of FIG. 4, the rotation from the input shaft "Input" is reduced in speed a little by the first group of planetary gear set GS1 and increased in speed a little by the second group of planetary gear set GS2 and outputted from the output shaft "Output".

Under Seventh speed ($7^{th}$), the input clutch C1, the H & LR clutch C3 and the front brake B1 are engaged, and the first one-way clutch F1 is engaged.

Due to engagement of the input clutch C1, the rotation of the input shaft "Input" is inputted to the second ring gear R2 and directly inputted to the second connecting member M2. Furthermore, due to engagement of the front brake B1, rotation of the first pinion carrier PC1 is suppressed, and thus, the rotation of the input shaft "Input" is reduced in speed by the first group of planetary gear set GS1 and the rotation thus reduced in speed is outputted to the fourth ring gear R4 from the first connecting member M1.

Furthermore, due to engagement of the H & LR clutch C3, the third and fourth sun gears S3 and S4 are forced to rotate like a single unit, and thus the second group of planetary gear set GS2 outputs from the third pinion carrier PC3 a rotation that is controlled by both rotation of the fourth ring gear R4 and rotation of the second connecting member M2.

That is, as is seen from the lever diagram of FIG. 4, the rotation from the input shaft "Input" is reduced in speed a little by the first group of planetary gear set GS1 and increased in speed a little by the second group of planetary gear set GS2 and outputted from the output shaft "Output".

Under Reverse (Rev.), the H & LR clutch C3, the front brake B1 and the reverse brake B4 are engaged.

Due to engagement of the front brake B1, rotation of the first pinion carrier PC1 is suppressed, and thus, the rotation from the input shaft "Input" is reduced in speed by the first group of planetary gear set GS1 and the rotation thus reduced in speed is outputted to the fourth ring gear R4 from the first connecting member M1.

Furthermore, due to engagement of the H & LR clutch C3, the third and fourth sun gears S3 and S4 are forced to rotate like a single unit, and due to engagement of the reverse brake B4, rotation of the second connecting member M2 is suppressed.

Thus, in the second group of planetary gear set GS2, the rotation of the fourth ring gear R4 is transmitted to the fourth sun gear S4, to the third sun gear S3 and to the third pinion carrier PC3 while changing its direction and finally outputted from the third pinion carrier PC3.

That is, as is seen from the lever diagram of FIG. 4, the rotation from the input shaft "Input" is reduced in speed by the first group of planetary gear set GS1 and reversed in direction by the second group of planetary gear set GS2 and outputted from the output shaft "Output".

The automatic transmission having the above-mentioned construction carries out a switching to a desired speed between First speed ($1^{st}$) and Seventh speed ($7^{th}$) in accordance with predetermined shift lines (viz., shift diagram) drawn based on a vehicle speed and a throttle valve open degree.

As has been explained hereinabove, the interlock is a locked condition of input our output shaft of the automatic transmission which is induced when intended engagement of one frictional element and unintended engagement of the other frictional element take place at substantially same time. In this case, the associated motor vehicle is subjected to a sudden deceleration against the driver's will, which deteriorates a riding conformability of the vehicle.

According to the present invention, there is provided means for detecting such undesired interlock of the automatic transmission. The means is associated with the automatic transmission control unit (ATCU) 20.

Figure 5:
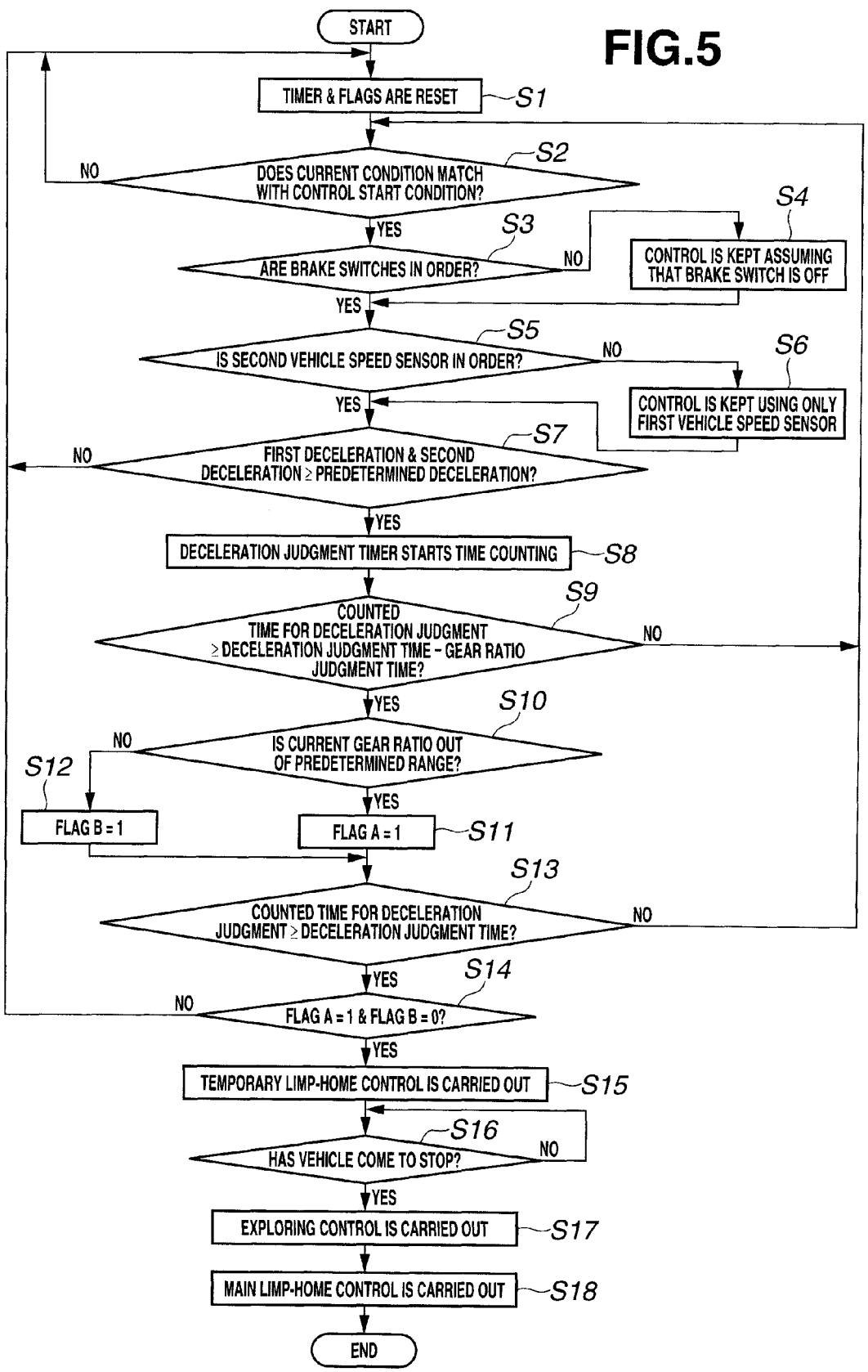
FIG. 5 is a flowchart showing programmed operation steps executed by a control unit (viz., automatic transmission control unit) for carrying out an interlock judgment control in the invention.

In the following, a control carried out by the automatic transmission control unit (ATCU) 20 for detecting the interlock will be described with reference to the flowchart of FIG. 5. That is, the flowchart of FIG. 5 shows programmed operation steps that are executed by the control unit 20 for judging the interlock of the automatic transmission.

At step S1, a timer and flags are reset. The timer and flags will be described in detail hereinafter.

At step S2, judgment is carried out as to whether or not a current condition matches with a control start condition. If YES, that is, when the current condition matches with the control start condition, the operation flow goes to step S3. While, if NO, that is, when the current condition does not match with the control start condition, the operation flow goes back to step S1.

The control start condition is a condition in which all of the following conditions are satisfied, which are as follows.

(1): The first vehicle speed sensor 5, first turbine rotation speed sensor 3 and second turbine rotation speed sensor 4 operate normally.

(2): The vehicle speed is higher than a predetermined speed.

(3): The turbine speed is higher than a predetermined speed.

(4): The shift lever takes a range position other than "P (parking)", "R (reverse)" and "N (neutral)" ranges.

(5): The transmission is not under ratio change.

(6): A predetermined time passes after completion of ratio change.

(7): A predetermined time passes after completion of shifting to "M (manual)" range in case of shifting the shift lever from "D (drive)" range to "M (manual)" range.

(8): The brake switch 9A and the side brake switch 9B are OFF.

That is, when all of these items (1) to (8) are satisfied, the current condition is judged to be the control start condition.

If the first vehicle speed sensor 5, first turbine rotation speed sensor 3 and second turbine rotation speed sensor 4 fail to normally operate, the undesired interlock of the transmission is not precisely judged. Accordingly, for the precise judgment of the interlock, these sensors 5, 3 and 4 should operate normally. See item (1).

When the vehicle speed is low and the turbine speed is low, the interlock of the transmission is not precisely judged. See items (2) and (3).

Due to inherent construction, the interlock is not induced when the shift lever takes "P", "R" or "N" range. See item (4).

Under ratio change, the transmission tends to show unstable gear ratio and thus the associated motor vehicle is subjected to a marked change in acceleration. Under such condition, it is difficult to judge whether such marked change in acceleration is caused by an interlock induced by unintended engagement of a frictional element or by a ratio change characteristic of the transmission such as the instability of the gear ratio. Accordingly, the control start condition should contain a condition wherein the transmission is not under ratio change. See item (5).

Just after ratio change, it tends to occur that due to delay in hydraulic pressure rise a desired gear ratio is not established to a complete level. Furthermore, just after shifting of the shift lever by the driver from "D" range to "M" range, it tends to occur that the transmission shows an unstable gear ratio particularly when the transmission assumes "D" range established by the engagement of one-way clutch. Thus, the condition wherein a predetermined time passes after completion of ratio change and the condition wherein a predetermined time passes after completion of shifting to "M" range in case of shifting the shift lever from "D" range to "M" range are needed for the control start condition. See items (6) and (7).

When the brake switch 9A or the side brake switch 9B is ON, the acceleration of the associated motor vehicle varies in accordance with a braking force applied to each road wheel. Thus the condition wherein the brake switch 9A and the side brake switch 9B are OFF is needed for the control start condition. See item (8).

The predetermined vehicle speed is set for example to 10 Km/h, the predetermined turbine speed is set for example to 300 rpm, and the predetermined time is set for example to 0.5 second.

At step S3, judgment is carried out as to whether the brake switch 9A and side brake switch 9B are in order or not. If YES, that is, when the brake switch 9A and side brake switch 9B are in order, the operation flow goes to step S5. While, if NO, that is, when the brake switch 9A and side brake switch 9B are not in order, the operation flow goes to step S4. YES judgment is made when such switch 9A or 9B shows a switching from OFF to ON or from ON to OFF, and NO judgment is made when, with the vehicle speed being higher than a predetermined level, the switch 9A or 9B keeps ON condition for a predetermined time. (It is to be noted that keeping ON condition of such switch 9A or 9B for a certain time in spite of moving of the vehicle is unreasonable.) Of course, when, thereafter the switch 9A or 9B changes its condition from ON to OFF, the NO judgment is cancelled. If the judgment is not clearly carried out (that is, for example, when the switch 9A or 9B does not show a switching from ON condition to OFF condition after ignition of the engine), NO judgment is made.

At step S4, the control is continuously carried out assuming that the brake switch 9A or 9B that has been judged NO at step S3 takes OFF condition. In case of Abnormal-ON case wherein the brake switch 9A or 9B becomes ON although a brake action is not applied to the vehicle, the control start condition is not satisfied, and thus, the interlock judgment control can not be carried out, which will induce the undesired sudden deceleration of the vehicle against the driver's will. Accordingly, when the brake switch 9A or the side brake switch 9B is out of order, the control is carried out assuming that the switch 9A or 9B takes OFF condition.

At step S5, judgment is carried out as to whether the second vehicle speed sensor 8 is in order or not. If YES, that is, when the second vehicle speed sensor 8 is in order, the operation flow goes to step S7. While, if NO, the operation flow goes to step S6. If the speed detected by the second vehicle speed sensor 8 differs from the speed detected by the first vehicle speed sensor 5, it is judged that the second vehicle speed sensor 8 is out of order.

At step S6, the control is carried out using only the first vehicle speed sensor 5. When the second vehicle speed sensor 8 is out of order, the undesired interlock of the transmission is not precisely detected, and thus, upon failure of the second vehicle speed sensor 8, the interlock judgment control is continued by using only the detected value of the first vehicle speed sensor 5.

At step S7 which is executed in a deceleration detecting means, judgment is carried out as to whether both a first deceleration calculated based on the detected value of the first vehicle speed sensor 5 and a second deceleration calculated based on the detected value of the second vehicle speed sensor 8 are greater than or equal to a predetermined deceleration or not. If YES, that is, when both the first and second decelerations are greater than or equal to the predetermined deceleration, the operation flow goes to step S8. While, if NO, that is, when both the first and second decelerations are smaller than the predetermined deceleration, the operation flow goes back to step S1. The predetermined deceleration is set for example to 0.35 G for the purpose of assured detection of the interlock of the transmission. It is to be noted that the deceleration greater than or equal to 0.35 G means that the deceleration is lower than or equal to −0.35 G. Furthermore, if at step S6 the control is carried out without usage of the second vehicle speed sensor 8, only judgment as to whether the first deceleration is greater than or equal to the predetermined deceleration is carried out.

At step S8, a deceleration judgment timer is started to count up a time for the deceleration judgment.

At step S9, judgment is carried out as to whether or not the time counted up by the deceleration judgment timer has reached a given value that is provided by subtracting a gear ratio judgment time (viz., second predetermined time) from a deceleration judgment time (viz., first predetermined time). If YES, that is, when the time has reached the given time, the operation flow goes to step S10. If NO, that is, when the time has not reached the given time, the operation flow goes back to step S2. The deceleration judgment time is set for example to 0.5 second and the gear ratio judgment time is set for example to 0.1 second.

At step S10 which is executed in a gear ratio calculation means, judgment is carried out as to whether an actual gear ratio is out of a predetermined range or not. If YES, that is, when the actual gear ratio is out of the predetermined range, the operation flow goes to step S11. While, if NO, that is, when the actual gear ratio is within the predetermined range, the operation flow goes to step S12. The predetermined range of gear ratio is set based on a gear ratio of a speed that is currently instructed. For example, the range is set to be ±6%. The actual gear ratio is calculated by dividing the rotation speed of the output shaft "Output" by that of the input shaft "Input". The rotation speed of the output shaft is detected by the first vehicle speed sensor 5, and that of the input shaft is detected by the first turbine rotation speed sensor 3 and the second turbine rotation speed sensor 4.

At step S11, the flag A is set to 1 (one).

At step S12, the flag B is set to 1 (one).

At step S13, judgment is carried out as to whether the time counted up by the deceleration judgment timer has reached the deceleration judgment time or not. If YES, that is, when the time has reached the deceleration judgment time, the operation flow goes to step S14. While, if NO, that is, when the time has not reached the deceleration judgment time, the operation flow goes back to step S2. If YES in step S13, it becomes known that the judgment of both the first deceleration and second deceleration being greater than the predetermined deceleration is continuously effected for the deceleration judgment time, and that the judgment as to whether the gear ratio is out of the predetermined range or not is continuously effected for the gear ratio judgment time.

As is described hereinabove, by judging whether the gear ratio is out of the predetermined range or not just before the time counting of the deceleration judgment timer, an estrangement of the gear ratio at the time when a certain time has passed after the change of gear ratio can be judged, and thus, a mis-detection wherein due to the inevitable temporary change of the gear ratio, the judgment would be so made that the gear ratio is within the predetermined range is suppressed.

At step S14 which is executed in an interlock judgment means, judgment is carried out as to whether the flag A is 1 (one) and at the same time the flag B is 0 (zero) or not. If YES, the operation flow goes to step S15 judging that an interlock has taken place in the transmission. While, if NO, that is, when the flag A is 0 (zero) or the flag B is 1 (one), the operation flow goes back to step S1 judging that a vehicle deceleration actually occurring is caused by external factors such as vehicle running condition or the like.

At step S15, a temporary limp-home control is carried out. That is, the control is carried out in accordance with a currently instructed speed, so that a vehicle running state exceeding the predetermined deceleration is suppressed. That is, when the currently instructed speed is $1^{st}$, $2^{nd}$ or $3^{rd}$ speed, all of the frictional elements are brought to their release condition to induce the neutral condition of the transmission. While, when the currently instructed speed is $4^{th}$, $5^{th}$, $6^{th}$ or $7^{th}$ speed, controls depicted by the table of FIG. 6 are carried out. That is, a different control is carried out for each instructed speed.

That is, as is seen from the table of FIG. 6, when the instructed speed is $4^{th}$ speed, the 2346 brake B3 is released. With this, $5^{th}$ speed is established when the input clutch C1 has been subjected to a mis-engagement (or engagement-failure), and a so-called 2.5 speed is established when the front brake B1 has been subjected to a mis-engagement (or engagement-failure). It is to be noted that the 2.5 speed is a convenient term expressing a gear ratio established between $2^{nd}$ and $3^{rd}$ speeds.

When the instructed speed is $5^{th}$ speed, the direct clutch C2 is released. With this, $6^{th}$ speed is established when the 2346 brake B3 has been subjected to a mis-engagement (or engagement-failure), and $7^{th}$ speed is established when the front brake B1 has been subjected to a mis-engagement (or engagement-failure).

When the instructed speed is $6^{th}$ speed, the 2346 brake B3 is released. With this, $5^{th}$ speed is established when the direct clutch C2 has been subjected to a mis-engagement (or engagement failure) and $7^{th}$ speed is established when the front brake B1 has been subjected to a mis-engagement (or engagement-failure).

When the instructed speed is $7^{th}$ speed, the front brake B1 is released. With this, $6^{th}$ speed is established when the 2346 brake B3 has been subjected to a mis-engagement (or engagement-failure), and $5^{th}$ speed is established when the direct clutch C2 has been subjected to a mis-engagement (or engagement-failure).

Referring back to the flowchart of FIG. 5, at step S16, judgment is carried out as to whether the vehicle has come to stop or not. If YES, that is, when the vehicle has come to stop, the operation flow goes to step S17. While, if NO, that is, when the vehicle is still moving, the operation of the step S16 is executed again and repeated until stopping of the vehicle. More specifically, when the vehicle speed becomes below a predetermined speed (for example, 5 km/h), it is judged that the vehicle has stopped.

At step S17, a so-called exploring control is carried out. In this control, the instructed speed is shifted from $1^{st}$ speed to $3^{rd}$ speed one after another, and by analyzing a relation between the instructed speed and an actual speed that is estimated from an actual gear ratio established by the instructed speed, finding the frictional element that is out of order and identifying the type of the failure that the frictional element has are carried out. As the failure, there are two types which are a so-called release-failure wherein the frictional element fails to be engaged in spite of receiving an engagement instruction and a so-called engagement-failure wherein the frictional element fails to be released or disengaged in spite of receiving a release instruction.

At step S18, a main limp-home control is carried out. In the main limp-home control, based on the results of step S17, a suitable speed is selected and actually established. That is, for example, when a frictional element is subjected to the engagement-failure, a speed that is established with usage of the frictional element is selected, and when a frictional element is subjected to the release-failure, a speed that is established without usage of the frictional element is selected. With this speed selection, deterioration of driving conformability of the vehicle is suppressed or at least minimized.

Figure 7:
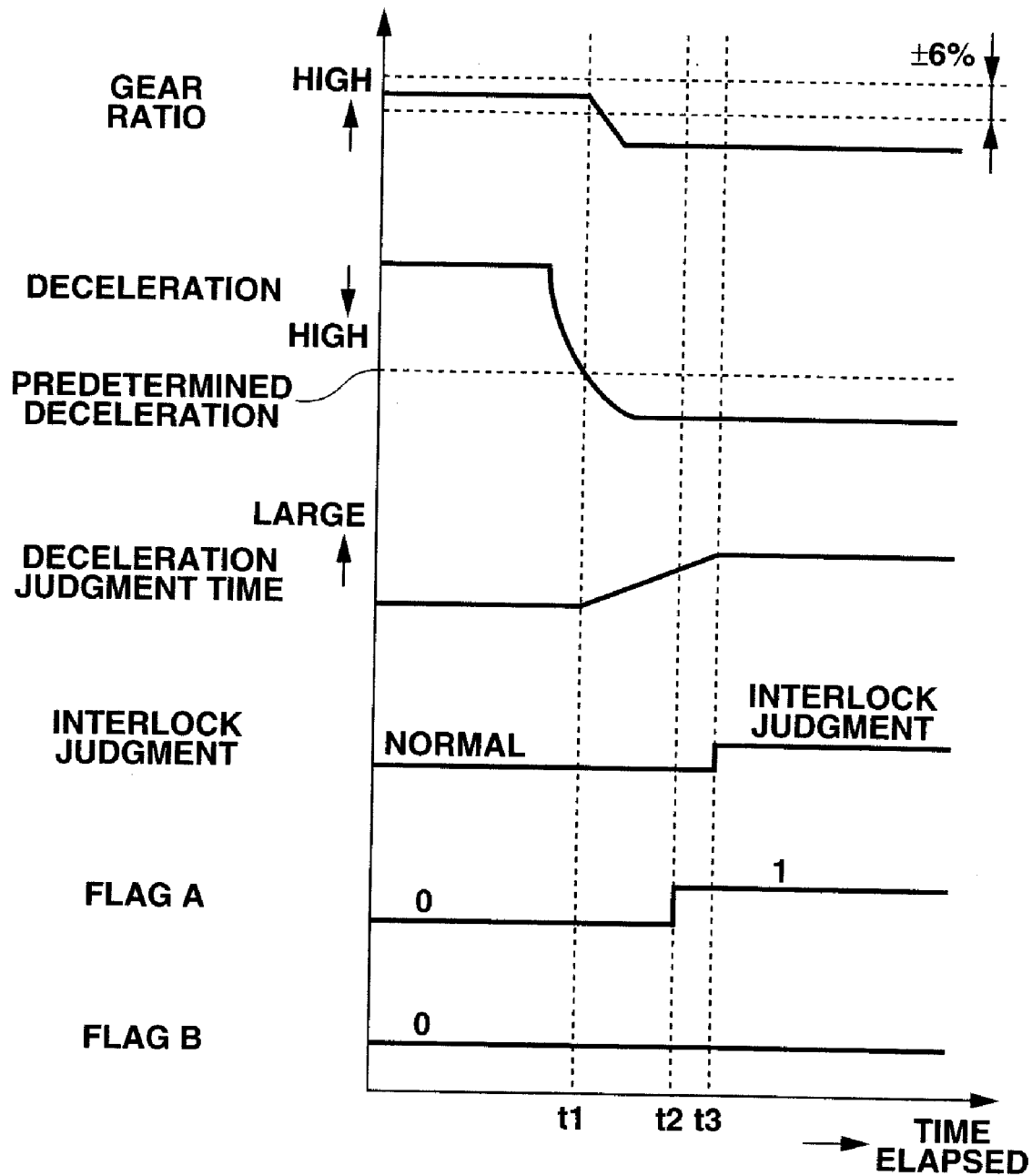
FIG. 7 is a time-chart depicting the outline of the interlock judgment control.

In the following, the interlock judgment control will be described with the aid of the time-chart of FIG. 7. In the time-chart, designated by (a) is a gear ratio, (b) is a deceleration, (c) is a deceleration judgment timer, (d) is an interlock judgment, (e) is a flag-A and (f) is a flag-B.

When, at time t1, the deceleration of the vehicle exceeds the predetermined deceleration, the deceleration judgment timer starts a time counting.

When, at time t2, the deceleration judgment timer counts a time (t2–t1) that is provided by subtracting a gear ratio judgment time (t3–t2) from a deceleration judgment time (t3–t1), the judgment as to whether the gear ratio is out of a predetermined range or not starts. Since the gear ratio is out of the predetermined range, the flag-A takes 1 (one).

When thereafter, at time t3, the deceleration judgment timer counts only the deceleration judgment time, the flag-A shows 1 (one) and the flag-B shows 0 (zero), and thus, it is judged that an interlock takes place in the transmission.

In the above-mentioned interlock judgment control, occurrence of the interlock is judged in accordance with the deceleration of the vehicle and the gear ratio shown by the transmission. This interlock judgment control differs from an abnormal gear ratio judgment control that detects only an estrangement of the gear ratio.

More specifically, the abnormal gear ratio judgment control is carried out in parallel with the above-mentioned interlock judgment control in such a manner as will be described in the following.

Figure 8:
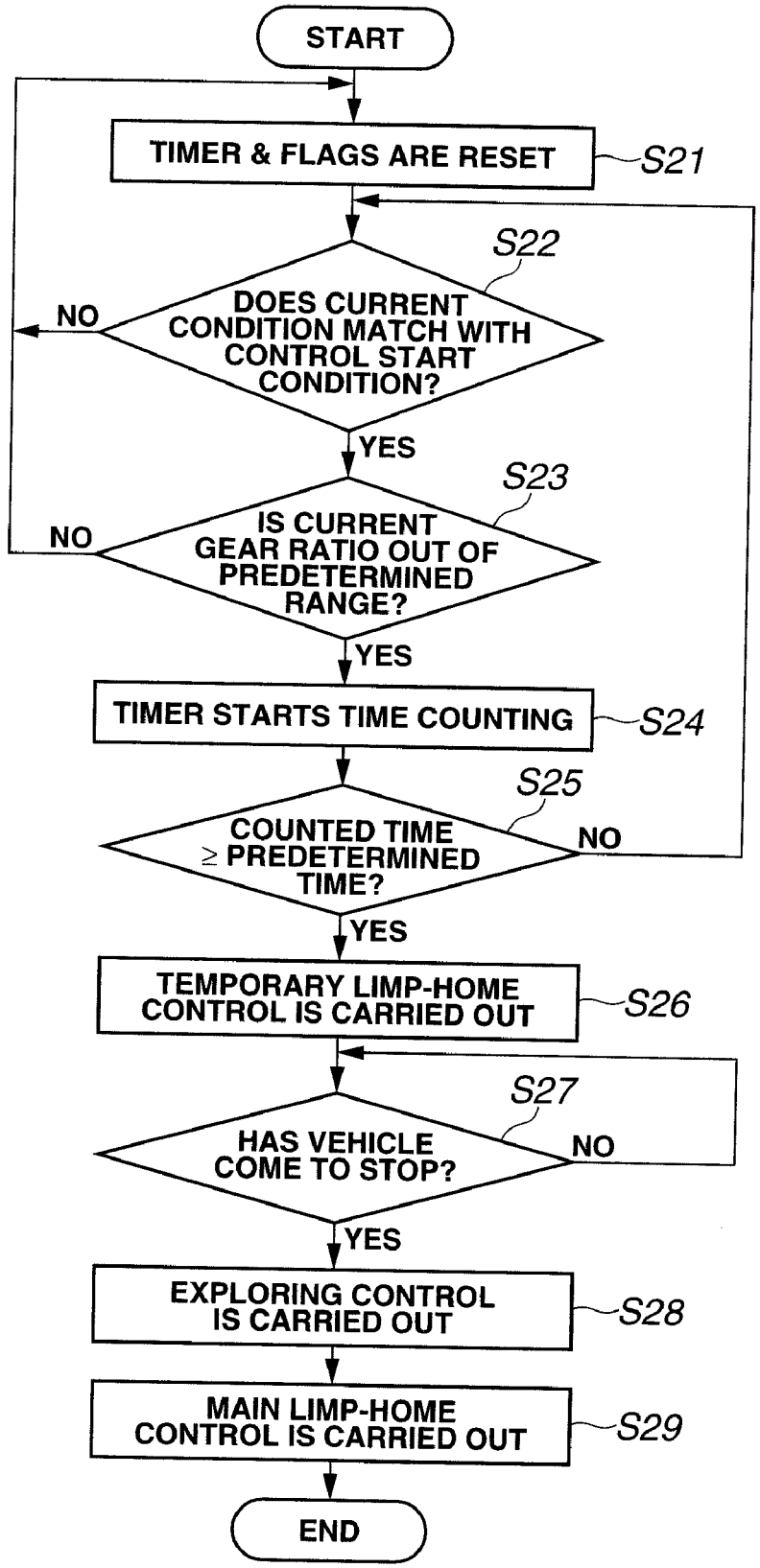
FIG. 8 is a flowchart showing programmed operation steps executed by the control unit (viz., automatic transmission control unit) for carrying out abnormal gear ratio judgment control in the invention.

FIG. 8 is a flowchart that shows programmed operation steps for the abnormal gear ratio judgment control.

At step S21, a timer and flags are reset. The timer and flags will be described in detail hereinafter.

At step S22, judgment is carried out as to whether or not a current condition matches with a control start condition. If YES, that is, when the current condition matches with the control start condition, the operation flow goes to step S23. While, if NO, that is, when the current condition does not match with the control start condition, the operation flow goes back to step S21.

At step S23, judgment is carried out as to whether an actual gear ratio is out of a predetermined range or not. If YES, that is, when the actual gear ratio is out of the predetermined range, the operation flow goes to step S24. While, if NO, that is, when the actual gear ratio is within the predetermined range, the operation flow goes back to step S21. The predetermined range is set based on a gear ratio of a speed that is currently instructed. For example, the range is set to be ±6%.

At step S24, the timer starts a time counting.

At step S25, judgment is carried out as to whether or not the timer has counted up a predetermined time (third predetermined time>first predetermined time, second predetermined time). If YES, that is, when the timer has counted up the predetermined time, the operation flow goes to step S26. While, if NO, that is, when the timer has not counted up the predetermined time, the operation flow goes back to step S22.

At step S26, a temporary limp-home control is carried out. That is, the current condition (or speed) of the transmission is kept without effecting ON/OFF changing of the frictional elements.

At step S27, judgment is carried out as to whether the vehicle has come to stop or not. If YES, that is, when the vehicle has come to stop, the operation flow goes to step S28. While, if NO, that is, when the vehicle is still moving, the operation of the step S27 is executed again and repeated until stopping of the vehicle. More specifically, when the vehicle speed becomes below a predetermined speed (for example, 5 km/h), it is judged that the vehicle has stopped.

At step S28, a so-called exploring control is carried out. In this control, the instructed speed is shifted from $1^{st}$ speed to $3^{rd}$ speed one after another, and by analyzing a relation between the instructed speed and an actual speed that is estimated from a real gear ratio established by the instructed speed, finding the frictional element that is out of order and identifying the type of the failure that the frictional element has are carried out. As the failure, there are two types which are a so-called release-failure wherein the frictional element fails to be engaged in spite of receiving an engagement instruction and a so-called engagement-failure wherein the frictional element fails to be released or disengaged in spite of receiving a release instruction.

At step S29, a main limp-home control is carried out. In this main limp-home control, based on the results of the step S28, a suitable speed is selected and actually established. That is, for example, when a frictional element is subjected to the engagement-failure, a speed that is established with usage of the frictional element is selected, and when a frictional element is subjected to the release-failure, that is established without usage of the frictional element is selected. With this speed selection, deterioration of driving conformability of the vehicle is suppressed or at least minimized.

As is described hereinabove, in the abnormal gear ratio judgment control, an undesired state wherein the actual gear ratio differs from a gear ratio that is to be provided by an instructed speed can be detected. However, occurrence of interlock can not be detected from the abnormal gear ratio judgment control.

In multi-speed automatic transmissions of nowadays, deterioration of the driving conformability of the vehicle can not be easily suppressed only by detecting occurrence of failure. Actually, the driving conformability of the vehicle tends to lower remarkably under a limp-home control. Accordingly, for achieving an appropriate limp-home control, it is important to identify the type of failure and carry out the limp-home control in accordance with the identified type of failure. When, as is described hereinabove, an interlock occurs in the transmission, the vehicle is subjected to a sudden deceleration against the driver's will. Thus, identifying the type of failure is quite important.

Accordingly, in the present invention, beside the above-mentioned abnormal gear ratio judgment control, the interlock judgment control as depicted by the flowchart of FIG. 5 is carried out.

That is, when an interlock occurs because of unintended engagement of a frictional element or elements to which no engagement instruction has been issued, an internal dynamic balance of the transmission is broken. By taking attention to this phenomenon, the judgment as to whether an interlock occurs or not is carried out based on a relation between the deceleration of vehicle, the instructed speed and the actual gear ratio. Accordingly, in the present invention, detection of the interlock is achieved without installing a sensor in a passage of a hydraulic circuit through which a hydraulic pressure is applied to the frictional element. This means reduction in number of parts used.

In the present invention, judgment of interlock is carried out based on, in addition to the deceleration of the vehicle, the relation between the instructed speed and the actual gear ratio. Accordingly, even when the vehicle is stuck in puddles of a road or being hauled or under traction thereby having no effect on the internal dynamic balance of the transmission, mis-judgment for the interlock is assuredly suppressed. That is, the undesired interlock can be precisely detected in the invention.

Furthermore, since the condition wherein the transmission is not under ratio change constitutes part of the control start condition for the interlock judgment control, the mis-judgment for the interlock that would be caused by fluctuation of gear ratio and/or enlargement in acceleration fluctuation of the vehicle, which inevitably occur under ratio change, can be suppressed.

In the present invention, when a condition wherein the vehicle deceleration is higher than a predetermined deceleration is kept for the deceleration judgment time and when a condition wherein an actual gear ratio is out of a predetermine range of gear ratio that is intended by the ratio change instruction is kept for the gear ratio judgment time, it is judged that interlock occurs. When interlock occurs, the gear ratio is forced to change in accordance with a clutch capacity of a frictional element whose engagement is not intended and a stick degree of a corresponding valve. Whether the actual gear ratio is larger than or smaller than the gear ratio intended by the instruction is largely affected by the position where the valve is subjected to the stick and the type of the frictional element that is engaged without intention. In other words, the type of change of gear ratio is not known until occurrence of failure. Accordingly, in the present invention, by finding or detecting that the actual gear ratio is out of a predetermined range of gear ratio that is intended by the ratio change instruction, judgment for the interlock of the transmission is assuredly carried out.

Upon occurrence of interlock, at least one of the frictional elements that have been engaged is released due to a ratio change instruction, which suppresses occurrence of interlock of the transmission. Thus, undesired sudden deceleration of the vehicle against the driver's will is suppressed. Furthermore, when the vehicle deceleration is lower than a predetermined level and the transmission is subjected to an abnormal gear ratio, the abnormal gear ratio judgment control is carried out, which is different from the interlock judgment control. Thus, the driving conformability of the vehicle is not deteriorated.

A condition wherein the brake switch 9A and side brake switch 9B are in order constitutes part of the control start condition for the interlock judgment control, and when at least one of the switches 9A and 9B is out of order or these switches 9A and 9B are unclear regarding normal/abnormal state thereof, the interlock judgment control is carried out assuming that the brake and side brake are not in operation. Thus, the judgment precision is increased. Furthermore, even when the brake switch 9A or the side brake switch 9B is out of order, the judgment control for the interlock is assuredly carried out.

The deceleration of the vehicle is derived based on information from the first and second vehicle speed sensors 5 and 8, and when the second vehicle speed sensor 8 is out of order, the deceleration of the vehicle is calculated by using only the information from the first vehicle speed sensor 5. That is, due to usage of the two vehicle speed sensors 5 and 8, the judgment for the interlock of the transmission can be made precisely.

As is seen from the flowchart of FIG. 5, at step S7, judgment is carried out as to whether both the first and second decelerations respectively derived from the first and second vehicle speed sensors 5 and 8 are greater than or equal to a predetermined deceleration or not. If YES, at step S8, the deceleration judgment timer is started to count up a time for the deceleration judgment. Then, at step S9, judgment is carried out as to whether or not the time counted by the deceleration judgment timer has reached a given value that is provided by subtracting the gear ratio judgment time from the deceleration judgment time. If YES, at step S10, judgment is carried out as to whether or not an actual gear ratio is out of a predetermined range of gear ratio that is intended by a ratio change instruction. If YES, that is, when the actual gear ratio is out of the predetermined range, it is judged that interlock has occurred in the transmission. Thus, the judgment as to whether the actual gear ratio differs from an intended gear ratio is carried out at a time that is after, by a predetermined time, the time when the vehicle deceleration has exceeded the predetermined deceleration. That is, the judgment is not carried out just after the time when the vehicle deceleration has exceeded the predetermined deceleration. In other words, the judgment is carried out at a time when the variation of the gear ratio has been settled, which induces a reliable judgment for the interlock of the transmission.

The entire contents of Japanese Patent Application 2007-075300 filed Mar. 22, 2007 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. An automatic transmission of a motor vehicle, comprising:
    a plurality of planetary gear units;
    a plurality of frictional elements, the frictional elements assuming engaged/disengaged condition upon receiving a ratio change instruction thereby to establish a desired speed of the transmission with the aid of the planetary gear units;
    a deceleration detecting means that detects a deceleration of the motor vehicle;
    a gear ratio detecting means that detects an actual gear ratio that is actually established in the transmission; and
    an interlock judgment means that judges whether or not the transmission is subjected to an interlock, the interlock being a condition wherein upon receiving the ratio change instruction, at least one of the frictional elements is brought into unintended engagement,
    the interlock judgment means being configured to carry out judgment of the interlock by analyzing the deceleration of the vehicle and a relation between a gear ratio intended by the ratio change instruction and the actual gear ratio actually established by the transmission while the transmission is not under a ratio change, and
    the interlock judgment means being configured to judge occurrence of the interlock when the deceleration of the vehicle is higher than a predetermined deceleration and the actual gear ratio relative to the intended gear ratio exceeds a predetermined range.

2. An automatic transmission as claimed in claim 1, in which the interlock judgment means carries out the judgment of the interlock when a condition wherein the deceleration of the vehicle is higher than the predetermined deceleration is kept for a first predetermined time and a condition wherein the actual gear ratio is out of the predetermined range of the gear ratio intended by the ratio change instruction is kept for a second predetermined time.

3. An automatic transmission of a motor vehicle, comprising:
    a plurality of planetary gear units;
    a plurality of frictional elements, the frictional elements assuming engaged/disengaged condition upon receiving a ratio change instruction thereby to establish a desired speed of the transmission with the aid of the planetary gear units;
    a deceleration detecting means that detects a deceleration of the motor vehicle;
    a gear ratio detecting means that detects an actual gear ratio that is actually established in the transmission;
    an interlock judgment means that judges whether or not the transmission is subjected to an interlock, the interlock being a condition wherein upon receiving the ratio change instruction, at least one of the frictional elements is brought into unintended engagement,
    the interlock judgment means being configured to carry out judgment of the interlock by analyzing the deceleration of the vehicle and a relation between a gear ratio intended by the ratio change instruction and the actual gear ratio actually established by the transmission while the transmission is not under a ratio change,
    in which the interlock judgment means carries out the judgment of the interlock when a condition wherein the deceleration of the vehicle is higher than a predetermined deceleration is kept for a first predetermined time and a condition wherein the actual gear ratio is out of a predetermined range of the gear ratio intended by the ratio change instruction is kept for a second predetermined time;
    a first limp-home control means that, when the interlock judgment means judges the interlock, causes the deceleration of the vehicle to be smaller than the predetermined deceleration by issuing instruction to at least one of the frictional elements; and
    a second limp-home control means that, when the deceleration of the vehicle is smaller than the predetermined deceleration and a condition wherein the actual gear ratio is out of the predetermined range intended by the ratio change instruction is kept for a third predetermined time, issues instruction to at least one of the frictional elements, that is different from the instruction issued from the first limp-home control means.

4. An automatic transmission as claimed in claim 1, further comprises a brake operation detecting means that detects whether a brake pedal is depressed or not, and in which the interlock judgment means carries out the judgment of the interlock when the transmission is not under ratio change and the brake operation is not carried out, and in which the interlock judgment means carries out the judgment of the interlock assuming that the brake operation is not carried out, when the brake operation detecting means is not in order or when it is impossible to carry out judgment as to whether the brake operation detecting means is in order or not.

5. An automatic transmission as claimed in claim 1, further comprises:
   a first rotation speed detecting means that detects a rotation speed of an output shaft of the transmission; and
   a second rotation speed detecting means that detects a rotation speed of a drive road wheel of the motor vehicle,
   in which the deceleration detecting means calculates the deceleration of the motor vehicle based on values detected by the first and second rotation speed detecting means, and
   in which when the second rotation speed detecting means is not in order, the deceleration detecting means calculates the deceleration of the motor vehicle based on only the values detected by the first rotation speed detecting means.

6. In an automatic transmission of a motor vehicle including a plurality of planetary gear units and a plurality of frictional elements, the frictional elements assuming engaged/disengaged condition upon receiving a ratio change instruction thereby to establish a desired speed of the transmission with the aid of the planetary gear units,
   a method for judging an interlock of the transmission, comprising:
      detecting a deceleration of the motor vehicle;
      detecting an actual gear ratio that is actually established in the transmission; and
      judging whether or not the transmission is subjected to an interlock, the interlock being a condition wherein upon receiving the ratio change instruction, at least one of the frictional elements is brought into unintended engagement, the judgment for the interlock being carried out by analyzing the deceleration of the vehicle and a relation between the gear ratio intended by the ratio change instruction and the actual gear ratio while the transmission is not under a ratio change, occurrence of the interlock being judged when the deceleration of the vehicle is higher than a predetermined deceleration and the actual gear ratio relative to the intended gear ratio exceeds a predetermined range.

7. A method as claimed in claim 6, in which the judgment for the interlock is carried out by:
   detecting that the deceleration of the vehicle is higher than the predetermined deceleration;
      continuing the detection of the deceleration of the vehicle for a first predetermined time from a time on which the detection of the vehicle deceleration being higher than the predetermined deceleration is made;
      judging whether or not a condition wherein the actual gear ratio is out of the predetermined range of the gear ratio intended by the ratio change instruction is kept for a second predetermined time; and
      judging that the transmission is subjected to an interlock when it is judged that the actual gear ratio is out of the predetermined range of the gear ratio intended by the ratio change instruction.

8. A method as claimed in claim 7, further comprising:
   upon judgment of the interlock, issuing first instruction to at least one of the frictional elements in order to make the deceleration of the vehicle smaller than the predetermined deceleration;
   and issuing second instruction to at least one of the friction elements when it is judged that actual gear ratio is out of the predetermined range of the gear ratio intended by the ratio change instruction without detected information in which the vehicle deceleration is higher than the predetermined deceleration, the second instruction being different from the first instruction.

* * * * *